(12) United States Patent
Kashtan (10) Patent No.: US 12,175,004 B2
(45) Date of Patent: Dec. 24, 2024

(54) IMPLEMENTING PRIVILEGE CAPABILITIES FOR DEVICES USED FOR CONTAINER NATIVE FUNCTION OPERATIONS

(71) Applicant: Red Hat, Inc., Raleigh, NC (US)

(72) Inventor: Yuval Kashtan, Tel Aviv (IL)

(73) Assignee: Red Hat, Inc., Raleigh, NC (US)

( * ) Notice: Subject to any disclaimer, the term of this patent is extended or adjusted under 35 U.S.C. 154(b) by 120 days.

(21) Appl. No.: 17/678,430

(22) Filed: Feb. 23, 2022

(65) Prior Publication Data
US 2023/0267231 A1    Aug. 24, 2023

(51) Int. Cl.
G06F 21/62    (2013.01)
(52) U.S. Cl.
CPC ................... *G06F 21/629* (2013.01)
(58) Field of Classification Search
CPC ........................................... G06F 21/629
USPC ........................................................ 726/19
See application file for complete search history.

(56) References Cited

U.S. PATENT DOCUMENTS

| | | | |
|---|---|---|---|
| 6,105,027 A | 8/2000 | Schneider et al. | |
| 7,934,029 B2 | 4/2011 | Xu et al. | |
| 9,083,651 B2 | 7/2015 | Bursell | |
| 9,462,056 B1 * | 10/2016 | Protopopov | H04L 67/567 |
| 10,027,658 B1 * | 7/2018 | Schwarz | G06F 21/44 |
| 10,110,493 B2 | 10/2018 | Talla et al. | |
| 10,339,332 B1 * | 7/2019 | Bendory | G06F 8/433 |
| 10,979,432 B1 * | 4/2021 | Frank | H04L 63/104 |
| 11,171,834 B1 | 11/2021 | Bockelmann et al. | |

(Continued)

FOREIGN PATENT DOCUMENTS

| | | | | |
|---|---|---|---|---|
| CA | 2954763 C | * | 5/2019 | G06F 21/34 |
| CN | 110502878 A | * | 11/2019 | |

(Continued)

OTHER PUBLICATIONS

Liguni et al., "Sprofiler: Automatic Generating System of Container-Native System Call Filtering Rules for Attack Surface Reduction," 2021 (CSCI), Las Vegas, NV, USA, 2021, pp. 704-709, doi: 10.1109/CSCI54926.2021.00182. (Year: 2021).*

(Continued)

*Primary Examiner* — Peter C Shaw (74) *Attorney, Agent, or Firm* — Kilpatrick Townsend & Stockton LLP (57) ABSTRACT

Privilege capabilities can be implemented for devices used for container native function (CNF) operations according to some aspects described herein. In one example, a system can receive a request for executing a CNF using a device in a computing cluster. The CNF can involve an operation associated with a privileged capability. The system can determine the CNF is associated with a first credential for the privileged capability based on a data structure that stores process-level capabilities for the CNF and file handle level capabilities for the device. The system can determine the device is associated with a second credential for the privileged capability based on the data structure. In response to determining that the CNF is associated with the first credential and the device is associated with the second credential, the system can execute the CNF using the device in the computing cluster.

17 Claims, 3 Drawing Sheets

(56) References Cited

U.S. PATENT DOCUMENTS

| | | | | |
|---|---|---|---|---|
| 2016/0080379 | A1* | 3/2016 | Saboori | H04L 63/0876 |
| | | | | 726/5 |
| 2019/0005227 | A1* | 1/2019 | Weinstein | G06F 9/46 |
| 2020/0213320 | A1* | 7/2020 | Levin | H04L 43/0876 |
| 2021/0097190 | A1* | 4/2021 | Scrivano | G06F 21/6218 |
| 2022/0053047 | A1* | 2/2022 | Lenrow | H04L 67/133 |
| 2022/0104005 | A1* | 3/2022 | Xiong | H04L 63/0853 |
| 2022/0255966 | A1* | 8/2022 | Sienicki | H04L 63/123 |
| 2022/0263835 | A1* | 8/2022 | Pieczul | H04L 67/10 |

FOREIGN PATENT DOCUMENTS

| | | | | |
|---|---|---|---|---|
| CN | 113051036 | A * | 6/2021 | G06F 21/105 |
| CN | 113507443 | A * | 10/2021 | |

OTHER PUBLICATIONS

Liu et al., "A Lightweight Container Security Framework Adapted to the Power Cloud Platform," 2021 IEEE 4th International Electrical and Energy Conference (CIEEC), Wuhan, China, 2021, pp. 1-5, doi: 10.1109/CIEEC50170.2021.9510589. (Year: 2021).*

Nguyen et al., "Enhancing CNF performance for 5G core network using SR-IOV in Kubernetes," 2022 24th International Conference on Advanced Communication Technology (ICACT), Pyeongchang Kwangwoon_Do, Korea, Republic of, 2022, pp. 501-506, doi: 10.23919/ICACT53585.2022.9728817. (Year: 2022).*

Kovács, "Comparison of different Linux containers," 2017 40th International Conference on Telecommunications and Signal Processing (TSP), Barcelona, Spain, 2017, pp. 47-51, doi: 10.1109/TSP.2017.8075934. (Year: 2017).*

Siddiqui et al., "Credentials as a Service Providing Self Sovereign Identity as a Cloud Service Using Trusted Execution Environments," 2021 IEEE International Conference on Cloud Engineering (IC2E), San Francisco, CA, USA, 2021, pp. 210-216, doi : 10.1109/IC2E52221.2021.00036. (Year: 2021).*

Bharadwaj et al., "Transition of Cloud Computing from Traditional Applications to the Cloud Native Approach, " 2022 IEEE North Karnataka Subsection Flagship International Conference (NKCon), Vijaypur, India, 2022, pp. 1-8, doi: 10.1109/ NKCon56289.2022.10126871. (Year: 2022).*

Spoorthi et al., "Mobile single sign-on solution for enterprise cloud applications," 2014 First International Conference on Networks & Soft Computing (ICNSC2014), Guntur, India, 2014, pp. 273-277, doi: 10.1109/CNSC.2014.6906717. (Year: 2014).*

Gjerdrum et al., "Diggi: A Secure Framework for Hosting Native Cloud Functions with Minimal Trust," 2019 First IEEE International Conference on Trust, Privacy and Security in Intelligent Systems and Applications (TPS-ISA), Los Angeles, CA, USA, 2019, pp. 18-27, doi: 10.1109/TPS-ISA48467.2019.00012. (Year: 2019).*

Yan et al., "The Intelligent Security Service Framework for Cloud-Native Operation," arXiv:2403.01507 Mar. 3, 2024. (Year: 2024).*

Gonzalez et al., "A Framework for Authentication and Authorization Credentials in Cloud Computing," 2013 12th IEEE International Conference on Trust, Security and Privacy in Computing and Communications, Melbourne, VIC, Australia, 2013, pp. 509-516, doi: 10.1109/TrustCom.2013.63. (Year: 2013).*

"H3C IMC User Access Manager Administrator Guide-7.3-5W107," Downloaded from Internet Feb. 23, 2022, New H3C Technologies Co., Ltd., http://www.h3c.com/en/d_201908/1218804_294551_0.htm.

"Configure a Dual NIC to Access Citrix ADM," Citrix, Sep. 14, 2021, https://docs.citrix.com/en-us/citrix-application-delivery-management-software/13/manage-system-settings/configure-dual-nic.html.

"Running DPDK Applications in a Kubernetes Virtual Environment Without Virtualized Iommu Support," GitHub, Inc., Downloaded from Internet Dec. 14, 2021, https://github.com/k8snetworkplumbingwg/sriov-network-device-plugin/blob/master/docs/dpdk/README-virt.md.

Nadeau, T., et al., "How vDPA Can Help Network Service Providers Simplify CNF/VNF Certification," Red Hat, Inc., Feb. 6, 2020, https://www.redhat.com/en/blog/how-vdpa-can-help-network-service-providers-simplify-cnfvnf-certification.

* cited by examiner

IMPLEMENTING PRIVILEGE CAPABILITIES FOR DEVICES USED FOR CONTAINER NATIVE FUNCTION OPERATIONS

TECHNICAL FIELD

The present disclosure relates generally to in distributed computing environments. More specifically, but not by way of limitation, this disclosure relates to implementing privilege capabilities for devices used for container native function operations.

BACKGROUND

Cloud native functions (CNF) are network functions designed and implemented to run inside containers in a distributed computing environment. A container is a relatively isolated virtual environment that can be generated by leveraging resource isolation features (e.g., cgroups and namespaces) of the Linux kernel. A CNF can be considered a containerized process, which can be permitted or prohibited from accessing features of the distributed computing environment. Capabilities can be defined for a CNF to set the permissions for the CNF. For example, network administration capabilities and system administration capabilities can be provided for a CNF to give access to network features and system features of the distributed computing environment.

To help automate the deployment, scaling, and management of software resources inside containers, some distributed computing environments may include container orchestration platforms. Container orchestration platforms can help manage containers to reduce the workload on users. One example of a container orchestration platform is Kubernetes. Distributed computing environments running Kubernetes can be referred to as Kubernetes environments.

DETAILED DESCRIPTION

A distributed computing environment can include a container native function (CNF) that is to be executed using one or more devices of the distributed computing environment. The CNF can involve an operation that is associated with a privileged capability. A privileged capability can be associated with increased access or manipulation of a device. For example, creating an Internet Protocol (IP) header for an IP packet, reconfiguring a network, and system administration operations may be operations that involve privileged capabilities. Typically, a system can perform a permission check to determine whether a CNF has a credential for the privileged capability. If the CNF is associated with the credential, the CNF can be executed on any device in the distributed computing environment. But, some devices may be associated with mission-critical operations, so using these devices to execute a CNF may pose a security risk for the distributed computing environment. As an example, a CNF may involve a use of two network interface cards (NICs). A first NIC can performs control and management operations, and a second NIC can be a single root input/output virtualization virtual function that is used as a fast data path. If the CNF has a credential for a network administration capability, the CNF can manage both of the NICs. But, it may be undesirable for the first NIC to be accessible by the CNF to perform network administration operations. So, CNFs may only be run in a distributed computing environment in which there is less concern about the CNF being able to be run on any device in the distributed computing environment.

Some examples of the present disclosure can overcome one or more of the abovementioned problems by providing a system that implements device level privilege capabilities for CNFs. The system can receive a request for executing a CNF using a device in a computing cluster. The CNF can involve an operation associated with a privileged capability. The system can determine the CNF is associated with a first credential for the privileged capability based on a data structure that stores process-level capabilities for the CNF and file handle level capabilities for the device. The system can also determine the device is associated with a second credential for the privileged capability based on the data structure. In response to determining that the CNF is associated with the first credential and the device is associated with the second credential, the system can execute the CNF using the device in the computing cluster. Alternatively, the system can prohibit the CNF from executing using the device if the device is not associated with the second credential. So, the CNF may be prohibited from executing on a device even if the CNF has a credential for the privileged capability. In this way, security of the system can be improved by only allowing a CNF to execute on the device if both the CNF and the device have credentials for the privileged capability.

One particular example can involve a computing cluster that is running Kubernetes as a container orchestration platform. A user can provide a system call to define CNF and device capabilities. The CNF can be associated with network administration operations and the system call can indicate that the CNF is to have a credential for network administration operations. The system call can also indicate that a first NIC is to have a credential for network administration operations, but that a second NIC is to not have the credential for network administration operations. The computing cluster can store the credentials indicated in the system call in a data structure.

The computing cluster can then receive a request for executing the CNF to perform network administration using the two NICs. The computing cluster can perform a lookup the data structure to determine that the CNF and the first NIC include the appropriate credentials, but that the second NIC does not have the appropriate credential. So, the computing cluster can determine that the first NIC can be used to execute the CNF for performing network administration, but that the second NIC is not permitted to execute the CNF for performing network administration. As a result, the computing cluster can execute the CNF using the first NIC.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
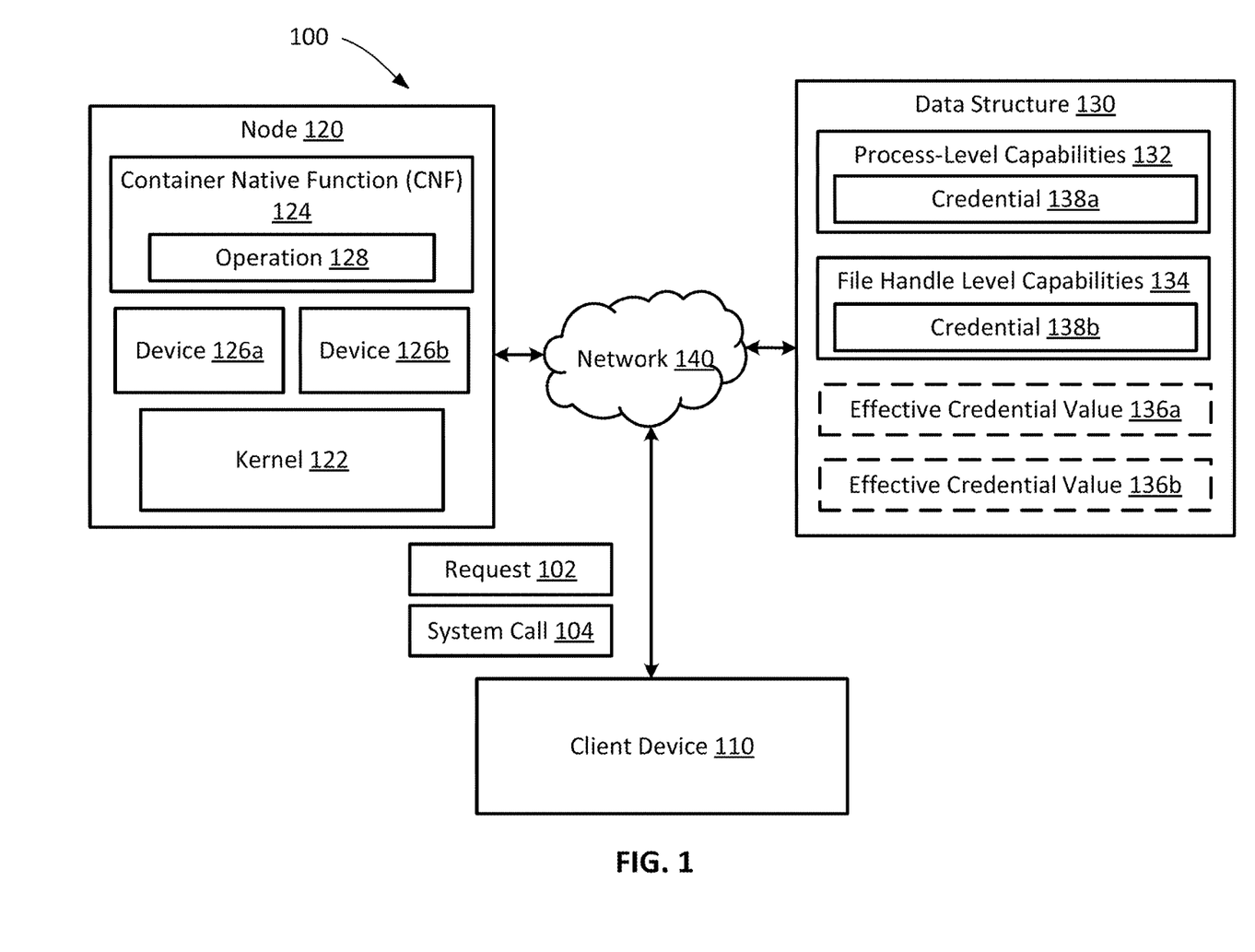
FIG. 1 shows a block diagram of an example of a system for implementing privilege capabilities for devices used for container native function operations according to some aspects of the present disclosure.

FIG. 1 is a block diagram of an example of a system 100 for implementing privilege capabilities for devices used for CNF operations according to some aspects of the present disclosure. The system 100 may include a computing cluster that may be formed from multiple nodes (e.g., servers or other computing devices) in communication with one another over one or more networks such as network 140. For example, node 120 can be part of the computing cluster. The nodes may communicate with one another to collectively perform tasks in the computing cluster. For example, the nodes can communicate with one another to perform distributed data processing or other distributed projects in the computing cluster. The computing cluster may include a container orchestration platform such as Kubernetes for assisting with managing (e.g., deploying and scaling) containers within the computing cluster. The system 100 can also include a client device 110 and a data structure 130 in communication with the node 120 via the network 140. Examples of the client device 110 can include a desktop computer, a laptop, a mobile phone, etc.

The node 120 can include a kernel 122 for interfacing between hardware of the node 120 and processes executed by the node 120. For example, the node 120 can include devices 126a-b that are hardware components managed by the kernel 122. Examples of the devices 126a-b can include network interface cards (NICs), storage devices, or other hardware components. As one particular example, the devices 126a-b can both be NICs that the kernel 122 can communicate with to perform network-related operations.

In some examples, the kernel 122 can receive a request 102 for executing a CNF 124 using a device 126a. The CNF 124 can be a network function designed and implemented to run inside a container. The request 102 can be received from the client device 110. The request 102 may also be a request for executing the CNF 124 using the device 126b. The kernel 122 can determine whether one or more of the devices 126a-b are associated with a credential to perform an operation 128 of the CNF 124. In some examples, the operation 128 can be associated with a privileged capability of increased access or manipulation of the device. For example, creating an Internet Protocol (IP) header for an IP packet, reconfiguring a network, and system administration operations may be operations that involve privileged capabilities. In Kubernetes, operations associated with sys_admin capabilities and net_admin capabilities may be considered to be privileged capabilities. Other operations may additionally be considered a privileged capability and involve a permission check. The permission check can involve the kernel 122 accessing the data structure 130 to determine whether the CNF 124 and the device have credentials for the privileged capability. Devices that do not have the credential may not be permitted to be used for the CNF 124 even if the CNF 124 has the credential for the privileged capability.

The kernel 122 can access the data structure 130 to determine whether the CNF 124 and the devices 126a-b are associated with credentials for the privileged capability. The kernel 122 can perform one or more lookups of the data structure 130 to determine whether the CNF 124 and the devices 126a-b are associated with credentials for the privileged capability. For example, the data structure 130 can include process-level capabilities 132 that indicate privileged capabilities for the CNF 124. Having a credential 138a for the CNF 124 in the process-level capabilities 132 can indicate that the CNF 124 is able to perform the privileged capability. The data structure 130 can also include file handle level capabilities 134 that indicate privileged capabilities for each of the devices 126a-b, with each of the devices 126a-b being associated with a different file handle. Having a credential 138b for the devices 126a-b in the file handle level capabilities 134 can indicate that the devices 126a-b are permitted to be used for the privileged capability.

The kernel 122 can perform a first lookup of the process-level capabilities 132 to determine whether the CNF 124 is associated with the credential 138a. Upon determining that the CNF 124 is associated with the credential 138a, the kernel 122 can perform a second lookup of the file handle level capabilities 134 to determine whether the devices 126a-b are associated with the credential 138b. For example, the kernel 122 may determine that the device 126a is associated with the credential 138b in the file handle level capabilities 134 and that the device 126b is not associated with the credential 138b in the file handle level capabilities 134. So, the kernel 122 can determine that since the CNF 124 is associated with the credential 138a and the device 126a is associated with the credential 138b, the device 126a can execute the CNF 124. The kernel 122 can then execute the CNF 124 using the device 126a. Upon determining that the device 126b is not associated with the credential 138b, the kernel 122 can prohibit the device 126b from executing the CNF 124.

Rather than performing multiple lookups of the data structure 130 to determine which of the devices 126a-b can be used to execute the CNF 124, the kernel 122 may perform a single lookup of the data structure 130. For example, the data structure 130 may include an effective credential values 136a-b that can be calculated based on the process-level capabilities 132 and the file handle level capabilities 134. There can be effective credential values 136a-b for each privileged capability for each of the devices 126a-b. For example, the effective credential value 136a can correspond to the privileged capability of the CNF 124 and the device 126a, and the effective credential value 136b can correspond to the privileged capability of the CNF 124 and the device 126b. The effective credential values 136a-b can determined from a logical AND of the process-level capabilities 132 and the file handle level capabilities 134. That is, the effective credential values 136a-b can indicate a credential for using a device for the CNF 124 if both the process-level capabilities 132 have the credential 138a and the file handle level capabilities 134 have the credential 138b.

For example, if the CNF 124 is associated with the credential 138a in the process-level capabilities 132 and the device 126a is associated with the credential 138b in the file handle level capabilities 134, the effective credential value 136a can be determined to be a value indicating that the device 126a can be used to execute the CNF 124. For example, the effective credential value 136a may be a value of one. Alternatively, if the CNF 124 is associated with the credential 138a in the process-level capabilities 132, but the device 126b is not associated with the credential 138b in the file handle level capabilities 134, the effective credential value 136b can be determined to be a value indicating that the device 126a cannot be used to execute the CNF 124. For example, the effective credential value 136b may be a value of zero.

The effective credential values 136a-b can be determined subsequent to an adjustment to the process-level capabilities 132 or the file handle level capabilities 134. For example, the kernel 122 may receive a system call 104 from the client device 110 that includes an indication of the credentials for the process-level capabilities 132 or the file handle level capabilities 134. Separate system calls may be received for the credentials for the process-level capabilities 132 and the file handle level capabilities 134. Upon receiving the system call 104, the kernel 122 can store the credentials 138a-b in the process-level capabilities 132 and the file handle level capabilities 134 in the data structure 130 based on the indications in the system call 104.

At some point in time, the kernel 122 can receive an additional system call with an update to the process-level capabilities 132 for the CNF 124 or the file handle level capabilities 134 for one or more of the devices 126a-b. The kernel 122 can then update the process-level capabilities 132 and the file handle level capabilities 134 in the data structure 130 based on the additional system call. For example, the kernel 122 may receive a system call indicating a credential for the device 126b to perform the privileged capability of the CNF 124. The kernel 122 can update the file handle level capabilities 134 to include the credential 138b for the device 126b. The kernel 122 can then determine an updated effective credential value based on the update to the file handle level capabilities 134. As an example, the kernel 122 may update the effective credential value 136b from a zero to a one based on the process-level capabilities 132 having the credential 138a and the file handle level capabilities 134 having the credential 138b for the device 126b.

As one particular example, the device 126a may be a first NIC that performs control and management operations, and the device 126b may be a second NIC that is a single root input/output virtualization virtual function that is used as a fast data path. The CNF 124 can be associated with network administration operations. The kernel 122 can receive the system call 104 indicating that the CNF 124 has a credential for the privileged capability of network administration. The system call 104 can also indicate that the device 126a has a credential for network administration, but that the device 126b does not have the credential for network administration. The kernel 122 can store the credential 138a for network administration for the CNF 124 in the process-level capabilities 132. The kernel 122 can also store the credential 138b for network administration for the device 126a in the file handle level capabilities 134. The effective credential value 136a for indicating whether network administration can be performed by the CNF 124 using the device 126a can be determined to be one. The file handle level capabilities 134 can exclude a credential for network administration for the device 126b, so the effective credential value 136b for indicating whether network administration can be performed by the CNF 124 using the device 126b can be determined to be zero.

The kernel 122 can then receive the request 102 for executing the CNF 124 to perform network administration using the devices 126a-b. The kernel 122 can perform a lookup the effective credential values 136a-b to determine that the effective credential value 136a is one and that the effective credential value 136b is zero. So, the kernel 122 can determine that the device 126a can be used to execute the CNF 124 for performing network administration, but that the device 126b is not permitted to execute the CNF 124 for performing network administration. As a result, the kernel 122 can execute the CNF 124 using the device 126a.

While the example shown in FIG. 1 has a certain number and arrangement of components, these are merely illustrative. Other examples can include more components, fewer components, or a different arrangement of the components shown in FIG. 1. For instance, other examples can involve a multitude of client devices interacting with any suitable type of distributed computing environment to execute CNFs. Although one node is illustrated in FIG. 1, other examples may include multiple nodes for executing CNFs. Each node may include a local data structure storing process-level capabilities and file handle level capabilities for the CNFs and devices of the node. Alternatively, the data structure 130 may be remote from and accessible by each of the nodes.

Figure 2:
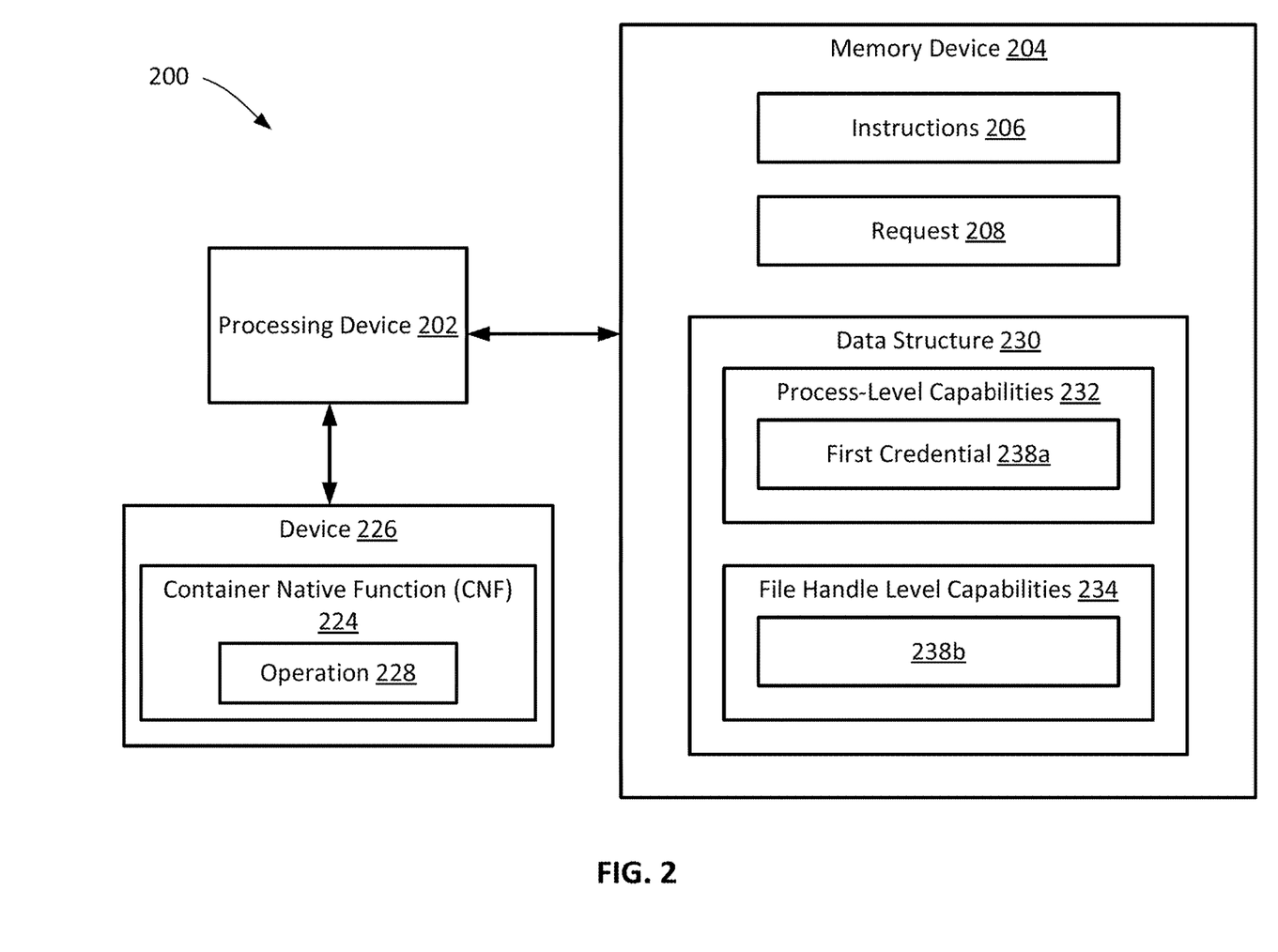
FIG. 2 shows a block diagram of another example of a system for implementing privilege capabilities for devices used for container native function operations according to some aspects of the present disclosure.

FIG. 2 shows a block diagram of another example of a system for implementing privilege capabilities for devices used for CNF operations according to some aspects of the present disclosure. The system can be a computing cluster 200. The computing cluster 200 includes a processing device 202 communicatively coupled with a memory device 204. The processing device 202 can include one processing device or multiple processing devices. Non-limiting examples of the processing device 202 include a Field-Programmable Gate Array (FPGA), an application-specific integrated circuit (ASIC), a microprocessor, etc. The processing device 202 can execute instructions 206 stored in the memory device 204 to perform operations. In some examples, the instructions 206 can include processor-specific instructions generated by a compiler or an interpreter from code written in any suitable computer-programming language, such as C, C++, C #, etc.

The memory device 204 can include one memory device or multiple memory devices. The memory device 204 can be non-volatile and may include any type of memory device that retains stored information when powered off. Non-limiting examples of the memory device 204 include electrically erasable and programmable read-only memory (EEPROM), flash memory, or any other type of non-volatile memory. In some examples, at least some of the memory device can include a computer-readable medium from which the processing device 202 can read instructions 206. A computer-readable medium can include electronic, optical, magnetic, or other storage devices capable of providing the processing device 202 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 206.

In some examples, the processing device 202 can receive a request 208 for executing a CNF 224 using a device 226 in the computing cluster 200. The device 226 may be a storage device, a NIC, or other device. The CNF 224 can involve an operation 228 associated with a privileged capability. For example, the operation 228 may be a system administration operation, a network administration operation, or another operation that is associated with a permission check. The processing device 202 can determine that the CNF 224 is associated with a first credential 238a for the privileged capability based on a data structure 230 that stores process-level capabilities 232 for the CNF 224 and file handle level capabilities 234 for the device 226. The processing device 202 can also determine the device 226 is associated with a second credential 238b for the privileged capability based on the data structure 230. In response to determining that the CNF 224 is associated with the first credential 238a and the device 226b is associated with the second credential 238b, the processing device 202 can execute the CNF 224 using the device 226 in the computing cluster 200. Another device that is not associated with the second credential 238b may be prohibited from executing the CNF 224. So, implementing permission checks at both the process level and the device level can improve security for the system by only allowing a CNF to execute on the device if both the process and the device have credentials for the privileged capability.

Figure 3:
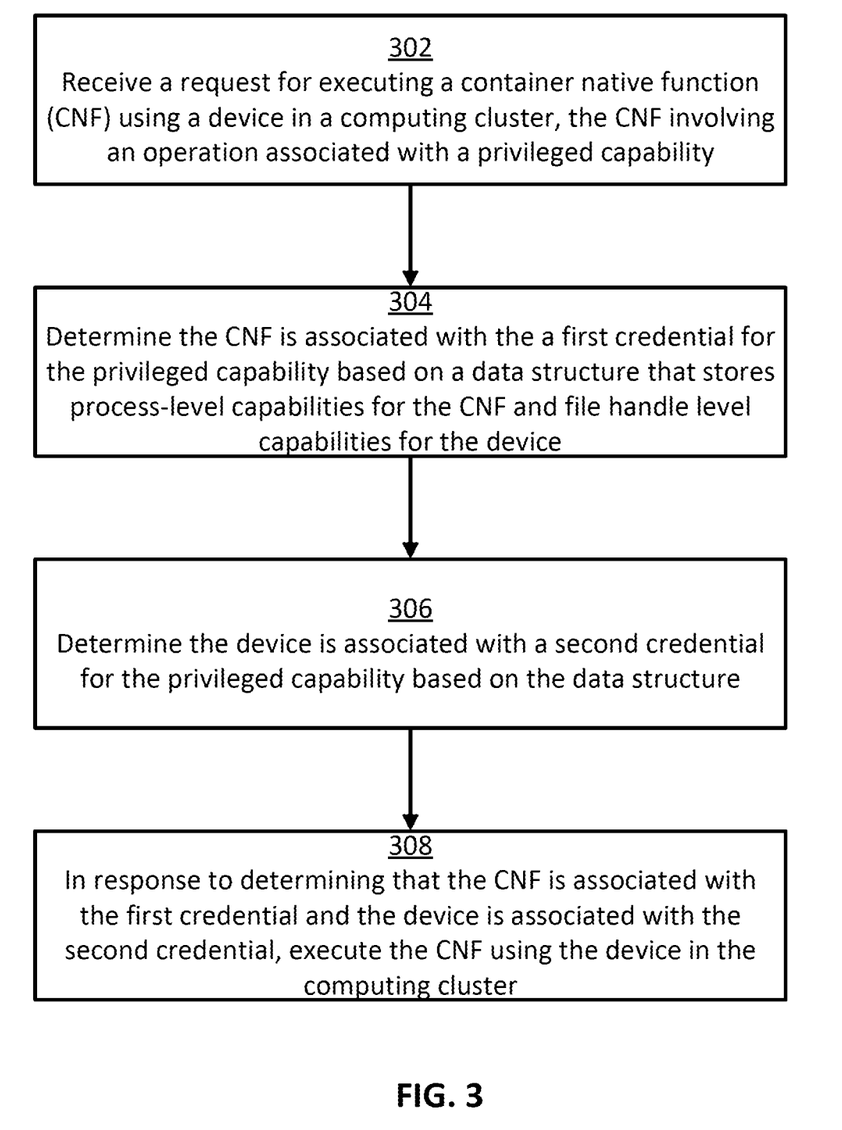
FIG. 3 shows a flow chart of an example of a process for implementing privilege capabilities for devices used for container native function operations according to some aspects of the present disclosure.

FIG. 3 shows a flow chart of an example of a process for implementing privilege capabilities for devices used for CNF operations according to some aspects of the present disclosure. In some examples, the processing device 202 can implement some or all of the steps shown in FIG. 3. Other examples can include more steps, fewer steps, different steps, or a different combination of steps than are shown in FIG. 3. The steps of FIG. 3 are discussed below with reference to the components discussed above in relation to FIG. 2.

In block 302, the processing device 202 receives a request 208 for executing a CNF 224 using a device 226 in a computing cluster 200. The CNF 224 can involve an operation 228 associated with a privileged capability. The CNF 224 can be a process for which a user can set privileged capabilities. The user can also set privileged capabilities for the device 226. The user can provide process-level capabilities for the CNF 224 and file handle level capabilities for the device 226 using one or more system calls that can be received by the processing device 202.

In block 304, the processing device 202 determines that the CNF 224 is associated with a first credential 238a for the privileged capability based on a data structure 230 that stores process-level capabilities 232 for the CNF 224 and file handle level capabilities 234 for the device 226. The processing device 202 can store the first credential 238a in the data structure 230 based on the system call(s) received from the user. The first credential 238a can be associated with the process-level capabilities 232. An entry in the process-level capabilities 232 for the privileged capability that is associated with the operation 228 can include the first credential 238a. The processing device 202 can perform a lookup of the process-level capabilities 232 to determine that the CNF 224 is associated with the first credential 238a for the privileged capability.

In block 306, the processing device 202 determines that the device 226 is associated with a second credential 238b for the privileged capability based on the data structure 230. The processing device 202 can store the second credential 238b in the data structure 230 based on the system call(s) received from the user. The second credential 238b can be associated with the file handle level capabilities 234. An entry in the file handle level capabilities 234 for the privileged capability that is associated with the operation 228 can include the second credential 238b. The processing device 202 can perform a lookup of the file handle level capabilities 234 to determine that the device 226 is associated with the second credential 238b for the privileged capability.

In some examples, rather than performing a separate lookup of the process-level capabilities 232 and the file handle level capabilities 234, the processing device 202 can perform a lookup of an effective credential value in the data structure 230. The effective credential value can be a single entry that provides an indication of whether the CNF 224 and the device 226 are both associated with the credentials for the privileged capability of the operation 228. Performing the lookup of the effective credential value can reduce a time of the processing device 202 performing a permission check.

In block 308, in response to determining that the CNF 224 is associated with the first credential 238a and the device 226 is associated with the second credential 238b, the processing device 202 executes the CNF 224 using the device 226 in the computing cluster 200. A device that is not associated with the first credential 238a can be prohibited from executing the CNF 224. Thus, only desired devices can be permitted to perform processes even if the process itself is associated with a credential for the privileged capability. So, security for the system can be improved.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example(s) described herein can be combined with any other example(s) to yield further examples.

The invention claimed is:

1. A non-transitory computer-readable medium comprising program code that is executable by a processing device for causing the processing device to perform operations including:
   receiving a request for executing a container native function (CNF) using a device in a computing cluster, the CNF involving an operation associated with a privileged capability;
   in response to receiving the request, determining the CNF is associated with a first credential for the privileged capability based on a data structure that stores process-level capabilities for the CNF and file handle level capabilities for the device by performing a first lookup of the process-level capabilities for the CNF;
   in response to determining that the CNF is associated with the first credential, determining the device is associated with a second credential for the privileged capability based on the data structure by performing a second lookup of the file handle level capabilities for the device; and
   in response to determining that the CNF is associated with the first credential and the device is associated with the second credential, executing the CNF using the device in the computing cluster.

2. The non-transitory computer-readable medium of claim 1, wherein the device is a first device and further comprising program code that is executable by the processing device for causing the processing device to perform operations comprising:
   receiving the request for executing the CNF involving the privileged capability using a second device associated with the CNF;
   determining the second device is not associated with the second credential for the privileged capability based on the data structure; and
   in response to determining that the second device is not associated with the second credential, prohibiting the second device from executing the CNF.

3. The non-transitory computer-readable medium of claim 1, further comprising program code that is executable by the processing device for causing the processing device to determine the CNF is associated with the first credential for the privileged capability based on the data structure and the device is associated with the second credential for the privileged capability based on the data structure by:
   determining an effective credential value by combining the process-level capabilities and the file handle level capabilities of the data structure;
   storing the effective credential value in the data structure; and
   in response to receiving the request, performing a lookup of the effective credential value.

4. The non-transitory computer-readable medium of claim 1, further comprising program code that is executable by the processing device for causing the processing device to perform operations comprising:
receiving an update to the process-level capabilities for the CNF or the file handle level capabilities for the device;
determining an updated effective credential value based on the update to the process-level capabilities for the CNF or the file handle level capabilities for the device; and
storing the updated effective credential value in the data structure.

5. The non-transitory computer-readable medium of claim 1, further comprising program code that is executable by the processing device for causing the processing device to perform operations comprising:
receiving an indication of the second credential for the privileged capability for the device by a system call from a client device; and
storing the second credential in the file handle level capabilities in the data structure based on the system call.

6. The non-transitory computer-readable medium of claim 1, wherein the device comprises a network interface card and the operation comprises a network administration operation.

7. A method comprising:
receiving a request for executing a container native function (CNF) using a device in a computing cluster, the CNF involving an operation associated with a privileged capability;
in response to receiving the request, determining the CNF is associated with a first credential for the privileged capability based on a data structure that stores process-level capabilities for the CNF and file handle level capabilities for the device by performing a first lookup of the process-level capabilities for the CNF;
in response to determining that the CNF is associated with the first credential, determining the device is associated with a second credential for the privileged capability based on the data structure by performing a second lookup of the file handle level capabilities for the device; and
in response to determining that the CNF is associated with the first credential and the device is associated with the second credential, executing the CNF using the device in the computing cluster.

8. The method of claim 7, wherein the device is a first device and the method further comprises:
receiving the request for executing the CNF involving the privileged capability using a second device associated with the CNF;
determining the second device is not associated with the second credential for the privileged capability based on the data structure; and
in response to determining that the second device is not associated with the second credential, prohibiting the second device from executing the CNF.

9. The method of claim 7, wherein determining the CNF is associated with the first credential for the privileged capability based on the data structure and the device is associated with the second credential for the privileged capability based on the data structure comprises:
determining an effective credential value from the process-level capabilities and the file handle level capabilities of the data structure;
storing the effective credential value in the data structure; and
in response to receiving the request, performing a lookup of the effective credential value.

10. The method of claim 9, further comprising:
receiving an update to the process-level capabilities for the CNF or the file handle level capabilities for the device;
determining an updated effective credential value based on the update to the process-level capabilities for the CNF or the file handle level capabilities for the device; and
storing the updated effective credential value in the data structure.

11. The method of claim 7, further comprising:
receiving an indication of the second credential for the privileged capability for the device by a system call from a client device; and
storing the second credential in the file handle level capabilities in the data structure based on the system call.

12. The method of claim 7, wherein the device comprises a network interface card and the operation comprises a network administration operation.

13. A system comprising:
a processing device; and
a memory device including instructions that are executable by the processing device for causing the processing device to:
receive a request for executing a container native function (CNF) using a device in a computing cluster, the CNF involving an operation associated with a privileged capability;
in response to receiving the request, determine the CNF is associated with a first credential for the privileged capability based on a data structure that stores process-level capabilities for the CNF and file handle level capabilities for the device by performing a first lookup of the process-level capabilities for the CNF;
in response to determining that the CNF is associated with the first credential, determine the device is associated with a second credential for the privileged capability based on the data structure by performing a second lookup of the file handle level capabilities for the device; and
in response to determining that the CNF is associated with the first credential and the device is associated with the second credential, execute the CNF using the device in the computing cluster.

14. The system of claim 13, wherein the device is a first device and the memory device further includes instructions that are executable by the processing device for causing the processing device to:
receive the request for executing the CNF involving the privileged capability using a second device associated with the CNF;
determine the second device is not associated with the second credential for the privileged capability based on the data structure; and
in response to determining that the second device is not associated with the second credential, prohibit the second device from executing the CNF.

15. The system of claim 13, wherein the memory device further includes instructions that are executable by the processing device for causing the processing device to determine the CNF is associated with the first credential for the privileged capability based on the data structure and the device is associated with the second credential for the privileged capability based on the data structure by:
   determining an effective credential value from the process-level capabilities and the file handle level capabilities of the data structure;
   storing the effective credential value in the data structure; and
   in response to receiving the request, performing a lookup of the effective credential value.

16. The system of claim 15, wherein the memory device further includes instructions that are executable by the processing device for causing the processing device to:
   receive an update to the process-level capabilities for the CNF or the file handle level capabilities for the device;
   determine an updated effective credential value based on the update to the process-level capabilities for the CNF or the file handle level capabilities for the device; and
   store the updated effective credential value in the data structure.

17. The system of claim 13, wherein the memory device further includes instructions that are executable by the processing device for causing the processing device to:
   receive an indication of the second credential for the privileged capability for the device by a system call from a client device; and
   store the second credential in the file handle level capabilities in the data structure based on the system call.

* * * * *